(12) United States Patent
Brandl et al.

(10) Patent No.: US 8,272,690 B2
(45) Date of Patent: Sep. 25, 2012

(54) JUVENILE VEHICLE SEAT WITH HEADREST-HEIGHT CONTROLLER

(75) Inventors: Curtis J. Brandl, Fishers, IN (US); Andrew B. Mendenhall, Mooresville, IN (US); Richard W. Glover, Greenwood, IN (US)

(73) Assignee: Cosco Management, Inc., Columbus, IN (US)

( * ) Notice: Subject to any disclaimer, the term of this patent is extended or adjusted under 35 U.S.C. 154(b) by 341 days.

(21) Appl. No.: 12/687,040

(22) Filed: Jan. 13, 2010

(65) Prior Publication Data

US 2010/0187879 A1    Jul. 29, 2010

Related U.S. Application Data

(60) Provisional application No. 61/145,061, filed on Jan. 15, 2009.

(51) Int. Cl.
*B60N 2/28* (2006.01)

(52) U.S. Cl. .................. 297/250.1; 297/256.11

(58) Field of Classification Search .............. 297/250.1, 297/256.1, 256.11, 410
See application file for complete search history.

(56) References Cited

U.S. PATENT DOCUMENTS

| | | | |
|---|---|---|---|
| 3,910,634 A | 10/1975 | Morris | |
| 5,082,325 A | 1/1992 | Sedlack | |
| 5,695,245 A | 12/1997 | Carlson et al. | |
| 5,836,650 A | 11/1998 | Warner, Jr. et al. | |
| 5,938,285 A | 8/1999 | Verbeek | |
| 5,971,476 A | 10/1999 | Gibson et al. | |
| 6,030,047 A | 2/2000 | Kain | |
| 6,135,553 A | 10/2000 | Lovie et al. | |
| 6,155,643 A | 12/2000 | Gorgi et al. | |
| 6,273,509 B1 | 8/2001 | Reighmeier et al. | |
| 6,398,302 B1 | 6/2002 | Freedman et al. | |
| 6,428,099 B1 | 8/2002 | Kain | |
| 6,464,294 B1 | 10/2002 | Kain | |
| 6,478,377 B2 | 11/2002 | Kassai et al. | |
| 6,491,348 B1 | 12/2002 | Kain | |
| 6,623,074 B2 | 9/2003 | Asbach et al. | |
| 6,779,843 B2 | 8/2004 | Kain | |
| 6,811,216 B2 | 11/2004 | Sedlack | |
| 7,021,710 B2 | 4/2006 | Kain et al. | |
| 7,195,314 B2 | 3/2007 | Spence et al. | |
| 7,232,185 B2 | 6/2007 | Hartenstine et al. | |
| 7,246,852 B2 * | 7/2007 | Balensiefer | 297/250.1 |
| 7,370,912 B2 | 5/2008 | Williams et al. | |
| 7,452,031 B2 * | 11/2008 | Woellert et al. | 297/250.1 |
| 8,087,725 B2 * | 1/2012 | Hutchinson et al. | 297/250.1 |
| 2007/0284925 A1 | 12/2007 | Balensiefer | |
| 2008/0088161 A1 | 4/2008 | Fritz et al. | |

FOREIGN PATENT DOCUMENTS

EP    1433653 A2    6/2004

OTHER PUBLICATIONS

The European Search Report issued in connection with EP 10150808.3 completed by the EP Searching Authority on Mar. 30, 2010.

* cited by examiner

*Primary Examiner* — Peter R. Brown

(74) *Attorney, Agent, or Firm* — Barnes & Thornburg LLP

(57) ABSTRACT

According to the present disclosure, a juvenile vehicle seat includes a base providing a seat bottom, a backrest extending upwardly from the base, and a movable headrest. The headrest is mounted for up-and-down movement on the backrest. The juvenile vehicle seat also includes a headrest-height controller configured to control the height of the movable headrest relative to the backrest.

12 Claims, 10 Drawing Sheets

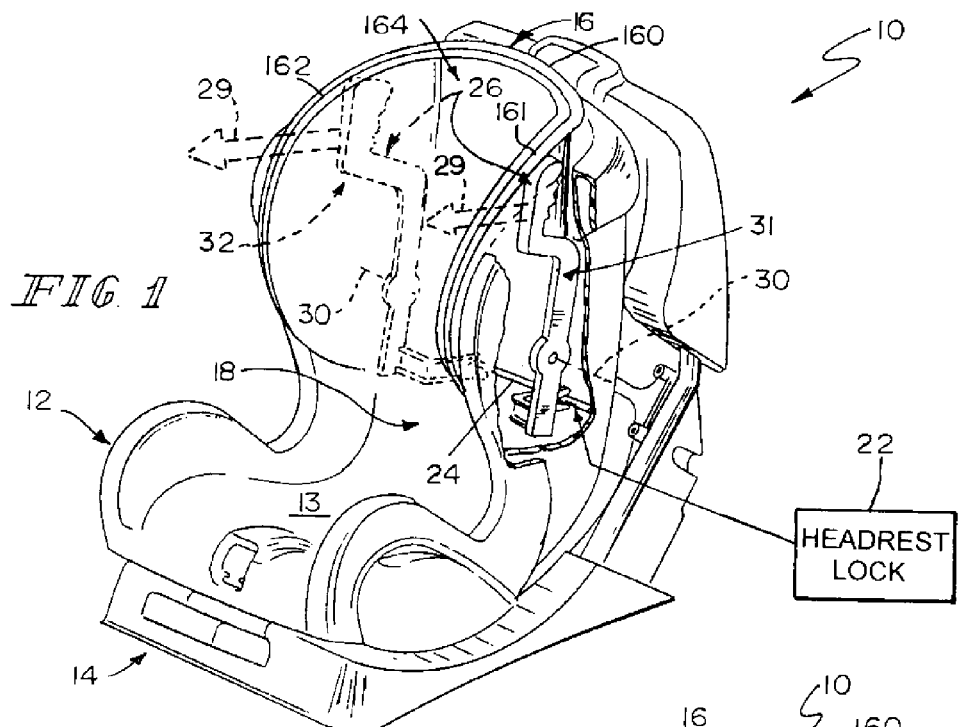
FIG. 1
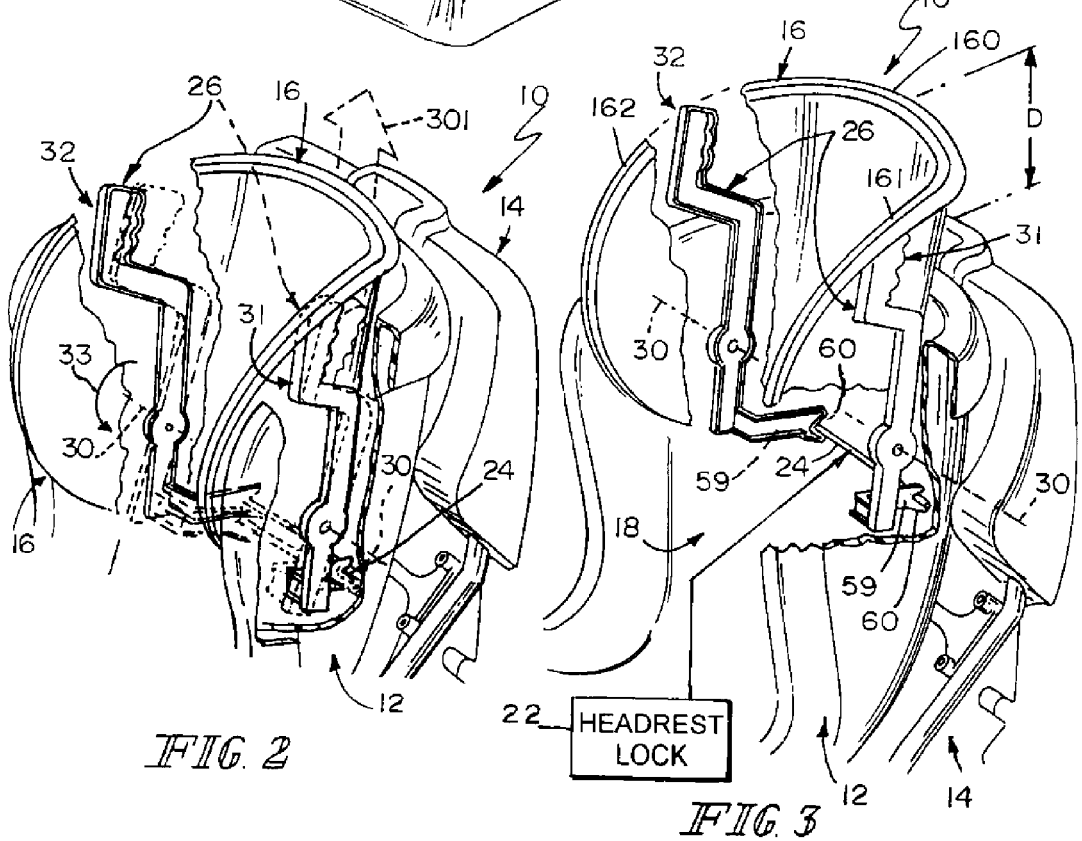
FIG. 2
FIG. 3

JUVENILE VEHICLE SEAT WITH HEADREST-HEIGHT CONTROLLER

This application claims priority under 35 U.S.C. §119(e) to U.S. Provisional Application Ser. No. 61/145,061, filed Jan. 15, 2009, which is expressly incorporated by reference herein.

BACKGROUND

The present disclosure relates to seats for use by children in vehicles, and in particular, to juvenile vehicle seats including a headrest mounted for movement on a seat back. More particularly, the present disclosure relates to a juvenile vehicle seat including an apparatus for raising and lowering the headrest on the seat back.

SUMMARY

According to the present disclosure, a juvenile vehicle seat includes a base providing a seat bottom, a backrest extending upwardly from the base, and a movable headrest. The headrest is mounted for up-and-down movement on the backrest.

In illustrative embodiments, the juvenile vehicle seat cooperates with an underlying seat support to form a child restraint. The juvenile vehicle seat includes a headrest-height controller configured to control the height of the movable headrest relative to the backrest.

In Illustrative embodiments, the headrest-height controller includes a headrest lock and a headrest-lock release. The headrest lock includes a movable headrest-retainer rod that is spring-biased by a pair of coiled return springs into rod-receiving notches formed in a pair of spaced-apart plates included in a headrest anchor coupled to a rearward facing surface of the backrest. The headrest-lock release includes a release lever mounted for movement on the headrest at the option of a caregiver to urge the headrest-retainer rod away from the backrest and out of the rod-receiving notches to free the headrest for up-and-down movement by the caregiver relative to the backrest. In an illustrative embodiment, the release lever is mounted to pivot about a pivot axis to move the headrest-retainer rod to a disengaged position separated from the rod-receiving notches whenever the caregiver desires to raise or lower the headrest to assume a new position on the backrest.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a front perspective view of a child restraint made in accordance with the present disclosure, the child restraint including a seat support adapted for mounting in a vehicle seat and a juvenile seat comprising a seat shell on which a juvenile may sit, a movable headrest mounted for up-and-down movement relative to the seat shell, and a headrest-height controller for controlling the height of the movable headrest relative to the seat shell, and suggesting that a caregiver can activate the headrest-height controller by moving a headrest-lock release in a forward direction (suggested by the phantom arrows and in an illustrative manner suggested in FIGS. 11-14) to release a handrest lock including a headrest-retainer rod, thereby allowing the movable headrest to move upwardly as suggested in FIGS. 2 and 3;

FIG. 2 is a partial front perspective view of the juvenile seat of FIG. 1, with portions broken away, revealing the headrest-lock release has moved in the forward direction suggested in FIG. 1 allowing the movable headrest to move upwardly as suggested by the phantom arrow above the headrest from a lowered position shown in FIGS. 1 and 2 to assume a raised position of the movable headrest shown in FIG. 3;

FIG. 3 is a view similar to FIG. 2 showing the movable headrest in the raised position and showing that the headrest-lock release has been released by the caregiver allowing a headrest lock to return to a locked position blocking up-and-down movement of the movable headrest relative to the seat shell and retaining the headrest in the raised position;

FIG. 11 is a right-side elevation view taken from the perspective line 11-11 of FIGS. 1 and 9, with portions broken away, revealing the position of the movable headrest relative to the headrest-height controller while the movable headrest is in the lowered position and suggesting that movement of the first lever release in a forward direction toward the caregiver (phantom arrow) will cause a headrest-retainer rod in the headrest lock to move out of engagement with an anchor receiver coupled to the backrest to establish a disengaged position of the headrest-retainer rod as suggested in FIG. 12;

FIG. 12 is a right-side elevation view taken from the perspective of line 12-12 of FIG. 2, with portions broken away, revealing a hand of a caregiver applying a force in a forward direction to the first release lever to cause the headrest-retainer rod to move to the disengaged position so that the movable headrest may be moved by the caregiver upwardly (phantom arrow above the movable headrest) to assume a raised position as suggested in FIGS. 13 and 14;

FIG. 13 is a view similar to FIG. 12 showing the hand of the caregiver still applying the force in the forward direction to the first release lever thereby keeping the headrest-retainer rod in the disengaged position throughout the movement of the movable headrest to the raised position;

FIG. 14 is a right-side elevation view taken from the perspective of line 14-14 of FIG. 10, with portions broken away, revealing the movable headrest in the raised position and showing that the hand of the caregiver has been removed from the first release lever to allow a pair of return springs included in the headrest lock to urge the headrest-retainer rod into contact with the rod-receiving notches formed in the anchor receiver to establish a normally-engaged position of the headrest-retainer rod and thereby block up-and-down movement of the movable headrest relative to the backrest;

DETAILED DESCRIPTION

Figure 4:
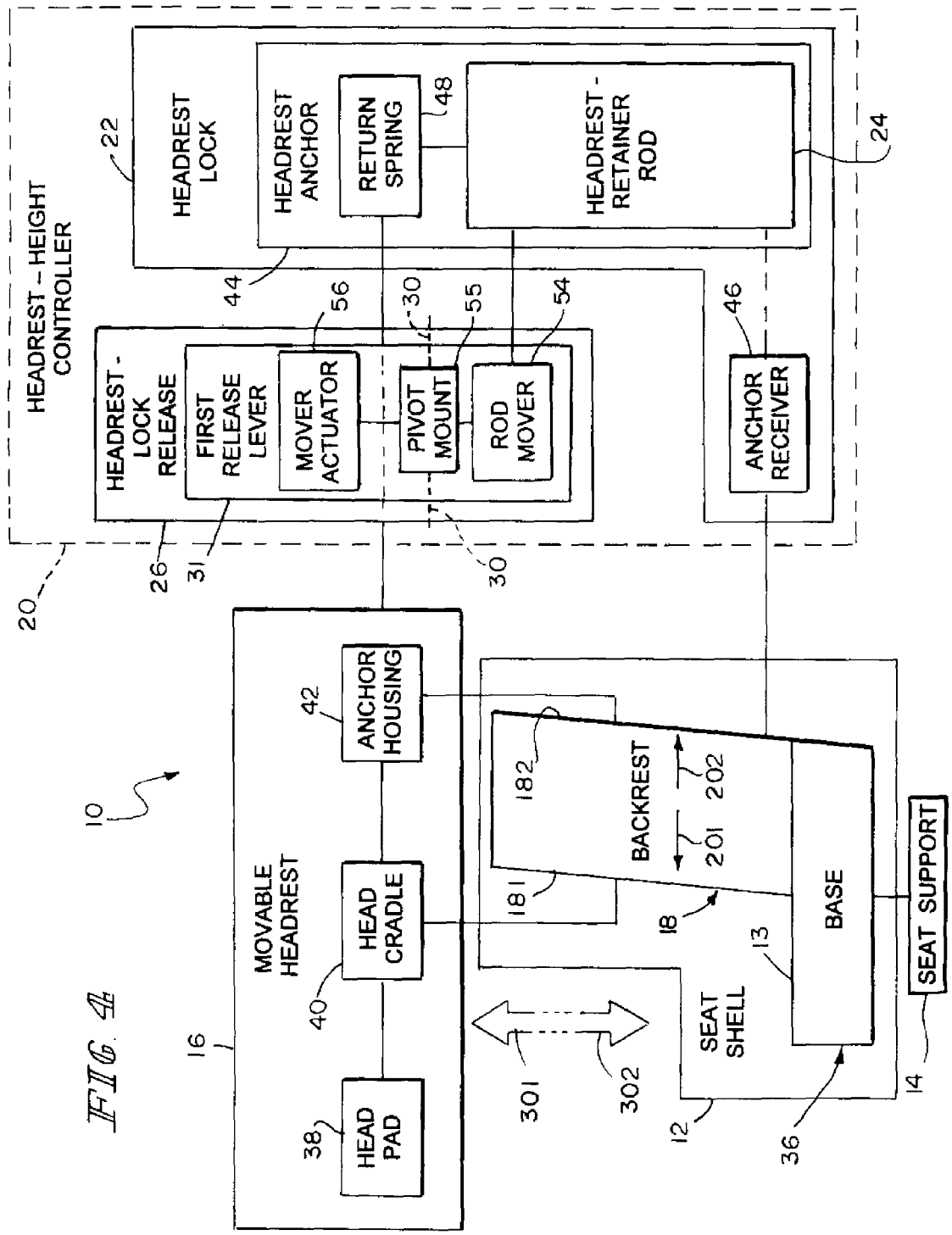
FIG. 4 is a diagrammatic view of a juvenile seat, in accordance with the present disclosure, the juvenile seat including a seat shell including a base and a backrest, a movable headrest mounted to the backrest for up-and-down movement relative to the backrest, and a headrest-height controller including a headrest-lock release and a headrest lock, and showing that the headrest-lock release includes a first release lever configured to release the headrest lock as shown illustratively in FIGS. 11-14 whenever a caregiver desires to raise or lower the headrest to assume a new position on the backrest.

A child restraint 10 in accordance with the present disclosure includes a seat shell 12 mounted on an underlying seat support 14 and a movable headrest 16 mounted for up-and-down movement on a backrest 18 included in seat shell 12 as suggested illustratively in FIGS. 1-3 and diagrammatically in FIG. 4. A headrest-height controller 20 included in child restraint 10 includes a headrest lock 22 comprising a movable headrest-retainer rod 24 and a headrest-lock release 26 comprising pivotable first and second release levers 31, 32. As suggested in FIGS. 9 and 10, a caregiver 28 can pull forwardly in direction 29 on upper ends of first and second release levers 31, 32 to cause levers 31, 32 to pivot about a horizontal pivot axis 30 in counterclockwise direction 33 to move headrest-retainer rod 24 in direction 34 away from backrest 18 to free headrest 16 for up-and-down movement on backrest 18 as suggested, for example, in FIGS. 11-14.

Figure 5:
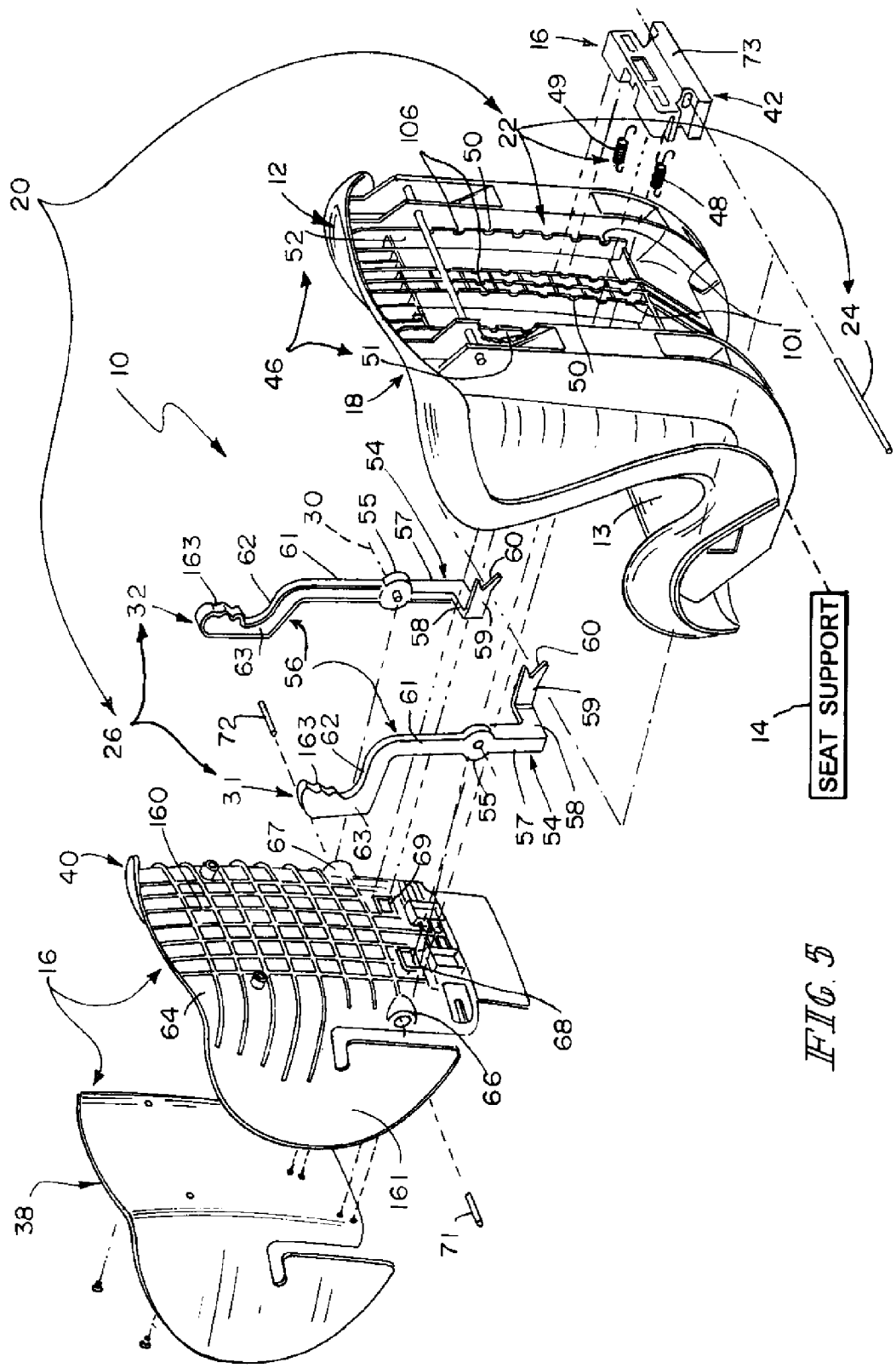
FIG. 5 is an exploded perspective assembly view of the juvenile seat of FIGS. 1-3, showing that the juvenile seat includes, from left to right, a head pad, a head cradle, a headrest-lock release including first and second release levers, a seat shell including a base and a backrest, and a headrest lock comprising an anchor receiver including multiple rod-receiving notches facing to the right, a pair of return springs, an anchor housing, and a headrest-retainer rod.

As suggested diagrammatically in FIG. 4 and illustratively in FIG. 5, seat shell 12 includes a base 36 and backrest 18 is arranged to extend upwardly away from base 36. Movable headrest 16 includes a head pad 38 configured to receive the head of a juvenile 28 seated in seat shell 12, a head cradle 40 coupled to head pad 38, and an anchor housing 42 coupled to head cradle 40. Head cradle 40 is positioned to lie between head pad 38 and backrest 18. Backrest 18 is positioned to lie between head cradle 40 and anchor housing 42. Head pad 38, head cradle 40, and anchor housing 42 move as a unit upwardly in direction 301 and downwardly in direction 302 relative to backrest 18 to change the position (i.e., elevation) of headrest 16 relative to base 36 under the control of a caregiver 28 operating first and second release levers 31, 32 included in headrest-lock release 26 of headrest-height controller 20 as suggested diagrammatically in FIG. 4 and illustratively in FIGS. 9, 10, and 11-14.

Headrest lock 22 of headrest-height controller 20 includes a headrest anchor 44 and an anchor receiver 46 as suggested diagrammatically in FIG. 4 and illustratively in FIG. 5. Headrest anchor 44 comprises a movable headrest-retainer rod 24 and a pair of return springs 48, 49. Each return spring 48, 49 is coupled at one end to headrest-retainer rod 24 and at an opposite end to anchor housing 42 of movable headrest 16 as shown best in FIGS. 15 and 16. Anchor receiver 46 comprises first and second plates 51, 52 coupled to backrest 18 to lie in spaced-apart relation to one another and formed to include a series of companion rod-receiving notches 50 sized to receive headrest-retainer rod 24 therein to establish the position (e.g., elevation) of movable headrest 16 on backrest 18 as suggested, for example, in FIGS. 8 and 11-14.

Each of first and second release levers 31, 32 of headrest-lock release 26 includes a pivot mount 55 intersecting pivot axis 30, a rod mover 54 extending downwardly from pivot mount 55 to engage headrest-retainer rod 24 of headrest anchor 44, and a mover actuator 56 extending upwardly from pivot mount 55 as suggested diagrammatically in FIG. 4 and illustratively in FIGS. 5 and 11-14. In an illustrative embodiment, rod mover 54 includes, in series, a downwardly extending leg 57, a laterally extending leg 58, and a rearwardly extending leg 59 formed to include a V-shaped notch 60 receiving headrest-retainer rod 24 therein as suggested in FIGS. 5 and 8. Also in an illustrative embodiment, mover actuator 56 includes, in series, an upwardly extending leg 61, a forwardly extending leg 62, and an upwardly extending portion 63 including a handgrip 163 as suggested in FIGS. 5 and 11-14.

Headrest-retainer rod 24 is urged by return springs 48, 49 to nest in V-shaped notches 60 formed in rearwardly extending legs 59 of each of first and second release levers 31, 32 as suggested in FIGS. 3, 7, 15, and 16. Headrest-retainer rod 24 thus always mates with first and second release levers 31, 32 as those levers 31, 32 are pivoted about pivot axis 30 by a caregiver during raising and lowering of headrest 16 on backrest 18 as suggested in FIGS. 10-14.

The elevation of headrest 16 on backrest 18 is established by inserting headrest-retainer rod 24 into one of the several companion pairs of rod-receiving notches 50 formed in the rearwardly extending spaced-apart first and second plates 51, 52 included in anchor receiver 46 and coupled to backrest 18 as suggested in FIGS. 8-14. In use, caregiver 28 grips and pivots release levers 31, 32 to move headrest-retainer rod 24 out of one set of rod-receiving notches 50 (and, at the same time, stretch return springs 48, 49 as suggested in FIG. 16), then raises or lowers headrest 16 on backrest 18 to position headrest-retainer rod 24 to confront another set of rod-receiving notches 50, and then ungrips release levers 31, 32 to allow return springs 48, 49 to contract and move headrest-retainer rod 24 into the confronting rod-receiving notches 50 to retain headrest 16 in the selected raised or lowered position on backrest 18. An illustrative process of using release levers 31, 32 to raise headrest 16 to assume an elevated position on backrest 18 is shown in FIGS. 9-14.

Figure 6:
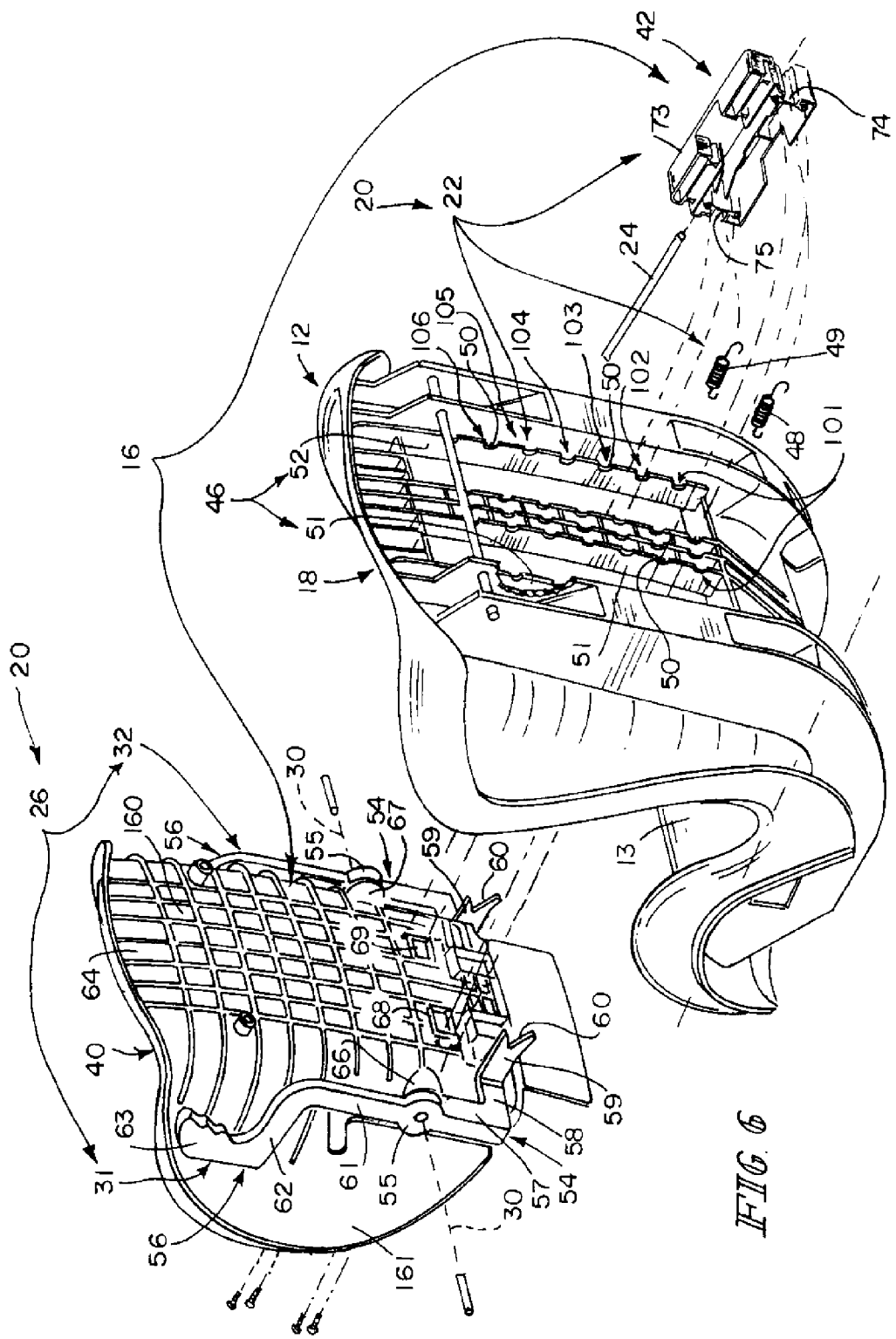
FIG. 6 is a partly exploded perspective assembly view of the juvenile seat of FIG. 5 showing the first and second release levers coupled to each side of the head cradle to pivot about a horizontal pivot axis and move up and down with the head cradle relative to the backrest and suggesting that the anchor housing includes two tabs that extend through a pair of vertical channels formed in the backrest and mate with companion tab mounts formed on a rearward facing surface of the head cradle to couple the anchor housing to the head cradle to move therewith relative to the backrest located therebetween.
Figure 7:
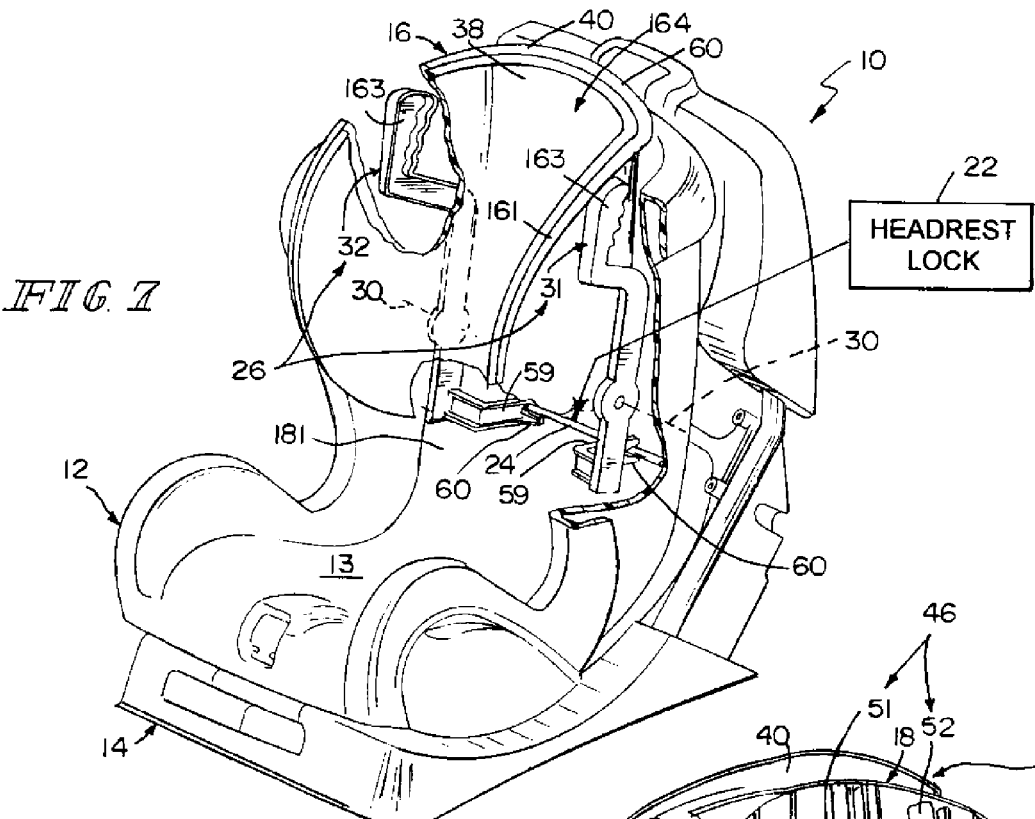
FIG. 7 is a front perspective view similar to FIG. 1, with portions broken away, revealing that the headrest-lock release is configured to be accessible to caregivers from the front of the juvenile seat as suggested in FIGS. 9 and 10 and that the headrest-lock release is configured to be operated by a caregiver to move the headrest lock located behind the backrest while the juvenile seat is coupled to the seat support.
Figure 8:
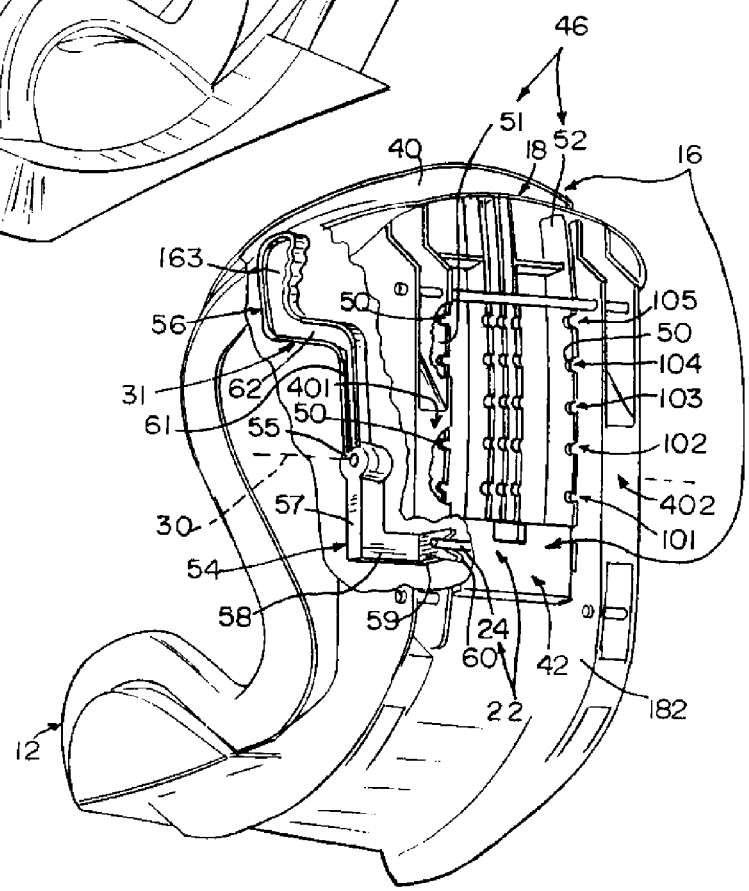
FIG. 8 is a rear perspective view of the juvenile seat of FIG. 7, with portions broken away, revealing that the right-side of the headrest-lock release is coupled to the headrest anchor and suggesting that the rod mover portion of the headrest-lock release extends through the backrest (as shown also in FIGS. 15 and 16) and is designed to move the headrest-receiver rod relative to the rod-receiving notches formed in the anchor receiver on the backrest in response to a caregiver using the first release lever.

As suggested in FIGS. 5 and 6, head cradle 40 is formed to include a panel 64, spaced-apart first and second lever mounts 66, 67 coupled to panel 64 at pivot axis 30, and spaced-apart first and second tab mounts 68, 69. A first axle 71 extends along pivot axis 30 and is coupled to first lever mount 66 and pivot mount 55 of first release lever 31 to support first release lever 31 for pivotable movement about pivot axis 30. A second axle 72 extends along pivot axis 30 and is coupled to second lever mount 66 and pivot mount 55 of second release lever 32 to support second release lever 32 for pivotable movement about pivot axis 30. Anchor housing 42 includes a shell 73 and first and second tabs 74, 75 coupled to shell 73 and configured to mate with tab mounts 68, 69 to retain shell 73 in place on panel 64 of head cradle 40 as suggested in FIGS. 5, 6, 8, 15, and 16. Shell 73 is formed to include a channel 76 receiving headrest-retainer rod 24 as suggested in FIGS. 15 and 16.

An illustrative method of using headrest-height controller 20 to move headrest 16 a distance D to a raised position on backrest 18 is shown in FIGS. 1-3 and also in FIGS. 9-14. Headrest 16 is shown in a lowered position on backrest 18 in FIGS. 9 and 11. As suggested in FIG. 9, caregiver 28 is positioned in front of a juvenile seated in seat shell 12 and has gripped each of first and second release levers 31, 32 included in headrest-lock release 26 of headrest-height controller 20. Caregiver 28 is prepared to raise movable headrest 16 to a raised position suggested in FIG. 10 using a method illustrated in FIGS. 11-14 while the juvenile remains seated in seat shell 12.

Figures 11, 12:
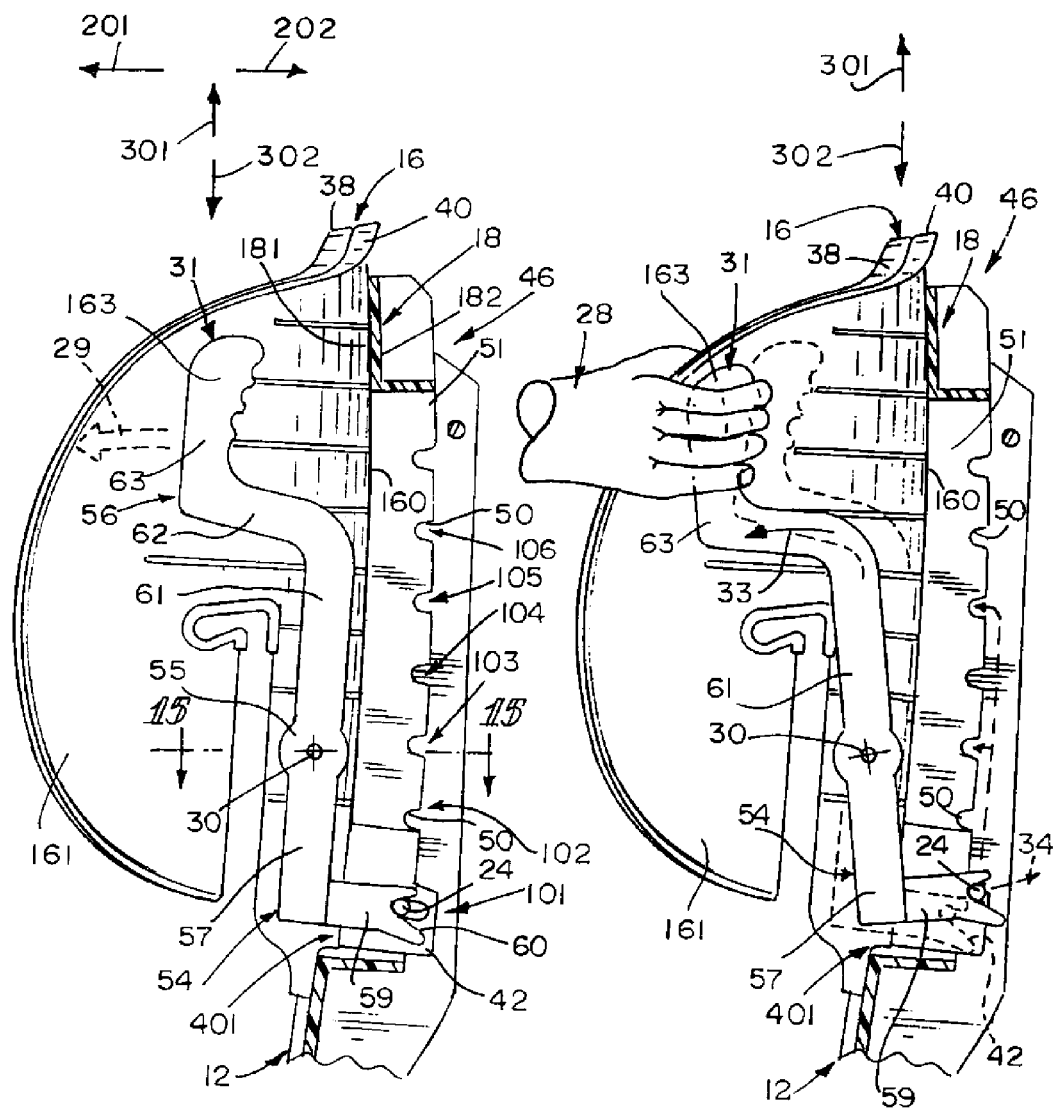
FIGS. 11-14 suggest an illustrative series of steps by which a caregiver may change the vertical position of the movable headrest relative to the backrest of the seat shell.
Figure 13:
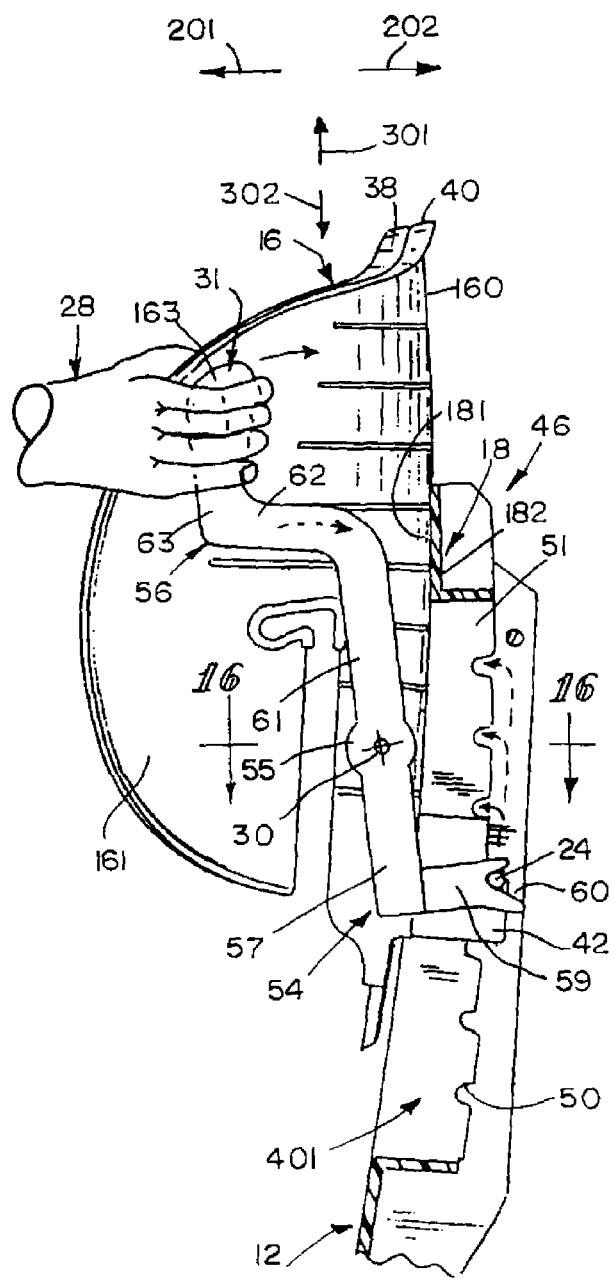

As suggested in FIG. 11, headrest 16 is retained in a lowered position on backrest 18 by engagement of headrest-retainer rod 24 in a lowest set of rod-receiving notches 50 formed in first and second plates 51, 52 of anchor receiver 46 coupled to backrest 18. Headrest-retainer rod 24 is thus held in an engaged position mated with anchor receiver 46. First release lever 31 engages headrest-retainer rod 24 and lies in an unpivoted upright position relative to head cradle 40 of headrest 16.

In an initial stage of operation shown in FIG. 12, caregiver 28 holds onto handgrip 163 of first release lever 31 (and also handgrip 163 of second release lever 32) and applies a force in a forward direction 29 to first release lever 31 to cause first release lever 31 to pivot about pivot axis 30 in counterclockwise direction 33 to push headrest-retainer rod 24 out of the rod-receiving notches 50 to move headrest-retainer rod 24 to a disengaged position separated from anchor receiver 46. Now, headrest 16 is free to be moved upwardly in direction 301 relative to backrest 18 as suggested in FIG. 13 to assume a raised position. During such upward movement, caregiver 28 continues to apply a force in forward direction 29 to first release lever 31 (and to second release lever 32) so as to keep headrest-retainer rod 24 in the disengaged position during movement of movable headrest 16 to the raised position so as to block return springs 48, 49 from urging headrest-retainer rod 24 into rod-receiving notches 50 associated with an unselected elevation on backrest 18 above the lowered position but below the raised position.

Figure 14:
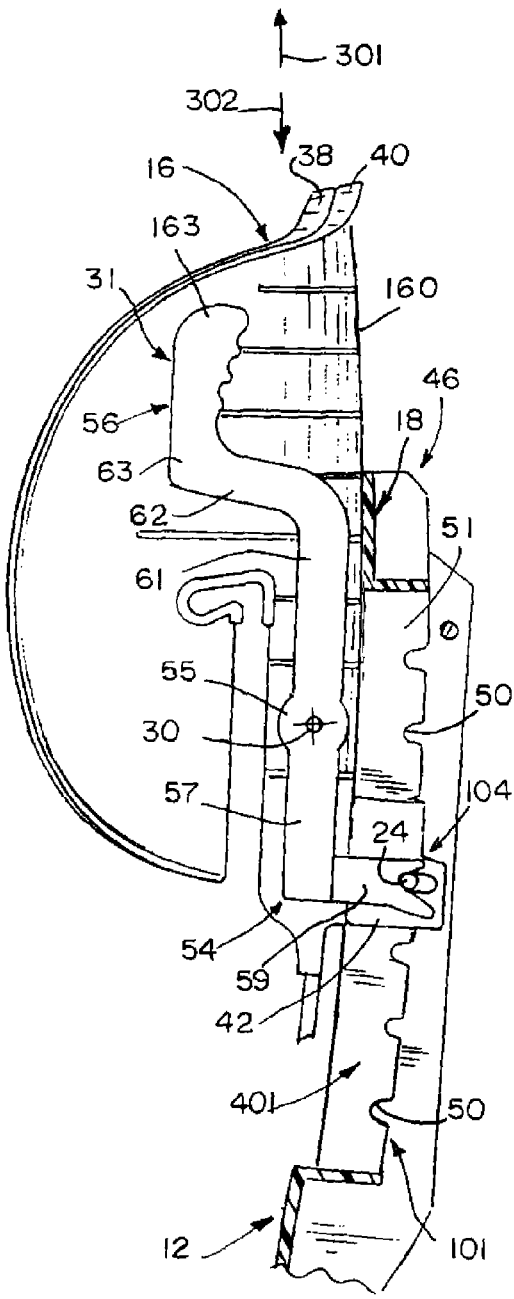

In a final stage of operation shown in FIG. 14, caregiver 28 has released a grip on first release lever 32 (and also on second release lever 32) to allow return springs 48, 49 in headrest anchor 44 to urge headrest-retainer rod 24 into companion rod-receiving notches 50 formed in first and second plates 51, 52 of anchor receiver 46 to establish a normally engaged position of headrest-retainer rod 24 and thereby block further up-and-down movement of movable headrest 16 relative to backrest 18 to retain headrest 16 in the selected raised position.

Child restraint 10 includes a seat shell 12 including a base 36 providing a seat bottom 13 and a backrest 18 extending upwardly from base 36 as suggested illustratively in FIG. 1 and diagrammatically in FIG. 4. Child restraint 10 also includes a headrest 16 mounted for up-and-down movement on backrest 18 and a headrest-height controller 20 arranged to adjust the height of headrest 16 above seat bottom 13 as suggested in FIGS. 4 and 9-14. Headrest-height controller 20 includes a headrest lock 22 and a headrest-lock release 26 as suggested in FIG. 4.

Headrest lock 22 includes a headrest anchor 44 and an anchor receiver 46 as suggested in FIG. 4. Anchor receiver 46 is coupled to backrest 18 and formed to include a series of anchor holders 101-106 et seq. as suggested in FIGS. 5, 6, and 8. Each anchor holder 101-106 is located at a different elevation above seat bottom 13. Headrest anchor 44 is arranged to move relative to anchor receiver 46 between a locked position engaging a selected first 101 of anchor holders 101-106 of anchor receiver 46 as suggested, for example, in FIG. 11 to retain headrest 16 in a selected fixed position on backrest 18 to establish the elevation of headrest 16 above seat bottom 13 and an unlocked position disengaging anchor holders 101-106 included in anchor receiver 46 as suggested, for example, in FIG. 13 to free headrest 16 for up-and-down movement in directions 101, 102 relative to backrest 18 to assume a different selected fixed position on backrest 18 associated with a selected second 104 of anchor holders 101-106 to establish a new elevation of headrest 16 above seat bottom 13.

Headrest-lock release 26 include first and second release levers 31, 32 as suggested in FIGS. 1 and 5. Each release lever 31, 32 is mounted for pivotable movement on headrest 16 about a pivot axis 30 to move headrest anchor 44 relative to anchor receiver 46 from the locked position to the unlocked position as suggested in FIGS. 1-3.

Headrest anchor 44 includes a movable headrest-retainer rod 24 as suggested diagrammatically in FIG. 4 and illustratively in FIG. 5. Backrest 18 includes a forward-facing surface 181 arranged to face in a first direction 201 toward a juvenile seated on seat bottom 13 and a rearward-facing surface 182 arranged to face in an opposite second direction 202 away from a juvenile seated on seat bottom 13 as suggested diagrammatically in FIG. 4 and illustratively in FIG. 11.

Anchor receiver 46 is coupled to rearward-facing surface 182 of backrest 18 and formed to include a series of rod-receiving notches 50 providing anchor holders 101-106 and sized to receive movable headrest-retainer rod 24 therein to establish the elevation of headrest 16 on backrest 18 relative to seat bottom 13 as suggested in FIGS. 6 and 11. First release lever 31 includes a handgrip 163 positioned to lie in spaced-apart relation to forward-facing surface 181 of backrest 18 as suggested in FIG. 11 to locate backrest 18 between handgrip 163 and movable headrest-retainer rod 24 and configured to be gripped by a user pivoting first release lever 31 about pivot axis 30 as suggested in FIGS. 9, 10, 12, and 13.

First release lever 31 includes a pivot mount 55 intersecting pivot axis 30, a rod mover 54 extending downwardly from pivot mount 55 in a direction toward seat base 36 to engage movable headrest-retainer rod 24, and a mover actuator 56 extending upwardly from pivot mount 55 in a direction away from seat base 36 as suggested in FIGS. 5 and 11. Mover actuator 56 is configured to include handgrip 163 as suggested in FIGS. 1 and 5.

Backrest 18 is formed to include first and second mover-receiving slots 401, 402 having openings in forward-facing and rearward-facing surfaces 181, 182 of backrest 18 as suggested in FIGS. 8, 11-14, 15, and 16. Rod mover 54 of first release lever 31 extends through the first mover-receiving slot 401 to engage movable headrest-retainer rod 24 and lies in first mover-receiving slot 401 during up-and-down movement of headrest 16 relative to backrest 18 as suggested in FIGS. 11-14. Rod mover 54 of first release lever 31 includes, in series, a downwardly extending leg 57 coupled to pivot mount 55, a laterally extending leg 58 arranged to lie in spaced-apart relation to forward-facing surface 181 of backrest 18, and a rearwardly extending leg 59 arranged to extend through the mover-receiving slot 401 formed in backrest 18 as suggested in FIGS. 11-14. Rearwardly extending leg 59 is formed to include a notch 60 receiving movable headrest-retainer rod 24 therein as suggested in FIGS. 3 and 11-14.

Figure 9:
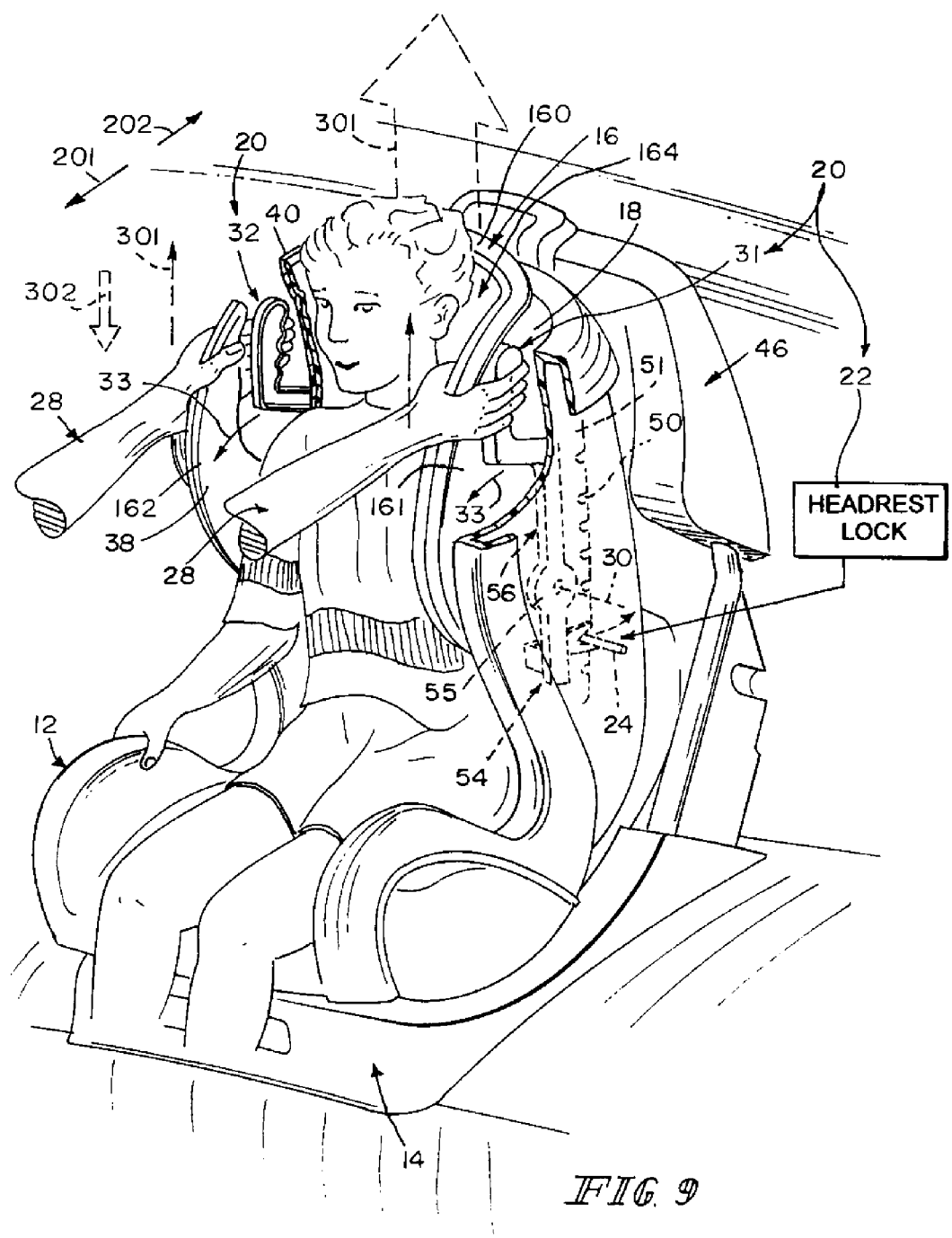
FIG. 9 is a perspective view showing a juvenile seated in the child restraint of FIGS. 1-3 and 5-8 showing a caregiver positioned in front of the juvenile preparing to raise the movable headrest on the backrest from a lowered position to a raised position suggested in FIG. 10 by an illustrative method suggested in FIGS. 11-14 while the juvenile remains seated in the seat shell of the child restraint.

Headrest 16 includes a rear wall 160 arranged to lie in confronting relation to forward-facing surface 181 of backrest 18, a first side wing 161 coupled to one edge of rear wall 160 and arranged to extend in first direction 201 away from backrest 18, and a second side wing 162 coupled to another edge of rear wall 160 and arranged to extend in first direction 201 and to lie in spaced-apart relation to first side wing 161 to define a head-receiving space 164 therebetween as suggested in FIGS. 1 and 9. Mover actuator 56 of first release lever 31 is arranged to lie in spaced-apart relation to second side wing 162 to locate first side wing 161 therebetween as suggested in FIG. 1.

Mover actuator 56 of first release lever 31 includes, in series, an upwardly extending leg 61 coupled to pivot mount 55 and arranged to lie a first distance away from forward-facing surface 181 of backrest 18 when headrest anchor 44 is located in the locked position, a forwardly extending leg 62 arranged to extend in first direction 201 away from backrest 18, and an upwardly extending portion 63 arranged to lie at a greater second distance away from forward-facing surface 181 of backrest 18 when headrest 16 is located in the locked position as suggested in FIG. 11. The upwardly extending portion 63 is configured to define handgrip 163.

Figure 10:
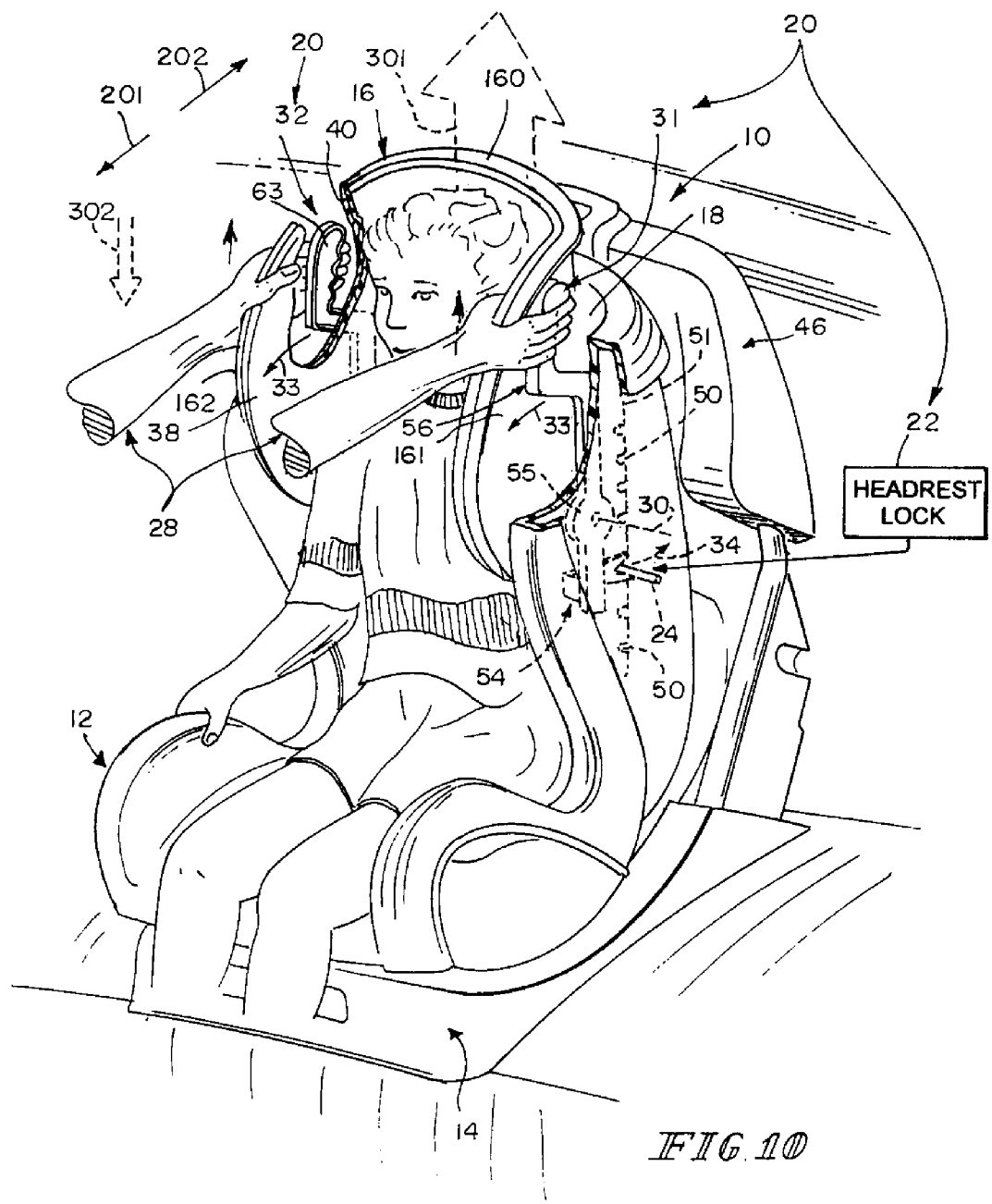
FIG. 10 is a view similar to FIG. 9 showing the movable headrest in the raised position after the caregiver has raised the movable headrest relative to the backrest using the illustrative method suggested in FIGS. 11-14.

First release lever 31 is oriented on pivot axis 30 to cause a portion of rod mover 54 engaging movable headrest-retainer rod 24 to move in second direction 202 away from rearward-facing surface 182 of backrest 18 as suggested in FIG. 12 in response to movement of handgrip 163 included in mover actuator 56, under the control of a caregiver 28 pivoting first release lever 31, in first direction 201 away from forward-facing surface 181 of backrest 18 to facilitate operation of first release lever 31 by a caregiver 28 situated in front of seat shell 12 to face toward forward-facing surface 181 of backrest 18 as suggested in FIGS. 9 and 10. Second release lever 32 is oriented on pivot axis 30 in a similar manner to function in a similar manner to first release lever 31 as suggested in FIGS. 1-3, 9, and 10.

Figure 15:
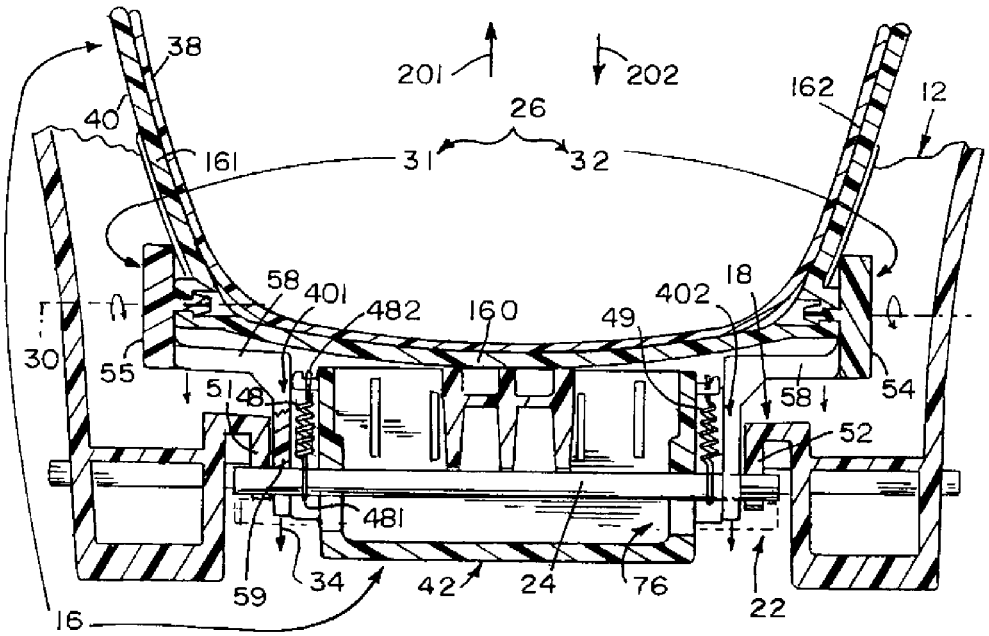
FIG. 15 is a sectional view taken along line 15-15 of FIG. 11 showing the headrest-retainer rod in the normally-engaged position and showing the first and second rod movers of the first and second release levers coupled to the head cradle for pivotable movement about a mover-actuator pivot axis and showing each rod mover in contact with the headrest-retainer rod.
Figure 16:
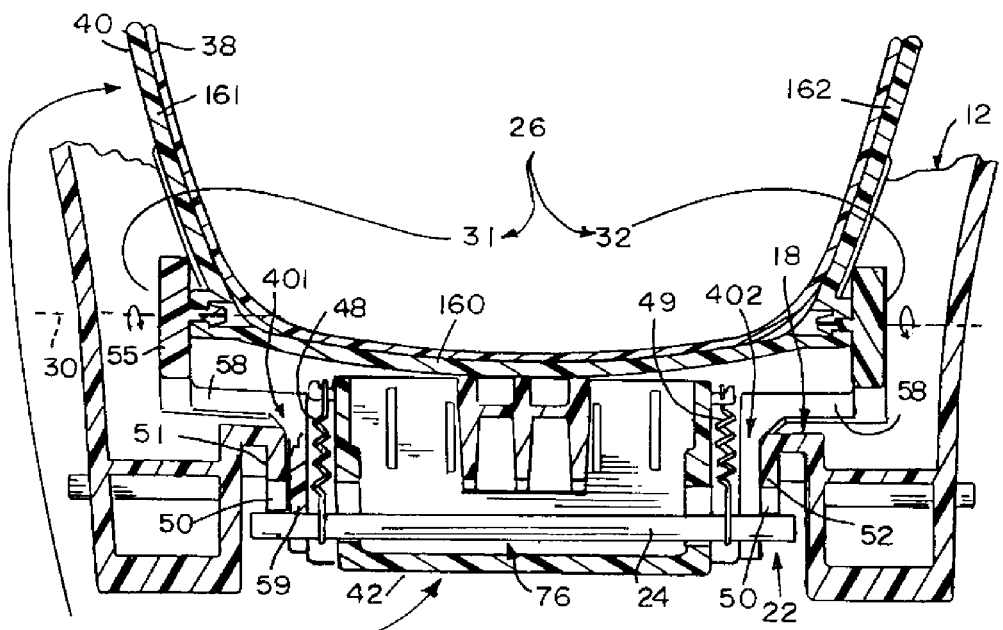
FIG. 16 is a sectional view taken along line 16-16 of FIG. 13 showing that the rod movers have engaged the headrest-retainer rod to move the headrest-retainer rod out of mating contact with the rod-receiving notches formed in the anchor receiver to establish the disengaged position so that the caregiver may change freely the vertical up-and-down position of the movable headrest relative to the backrest as suggested in FIGS. 10 and 14.

Headrest anchor 44 further includes a first return spring 48 coupled at one end 481 to movable headrest-retainer rod 24 and coupled at an opposite end 482 to headrest 16 for up-and-down movement therewith relative to backrest 18 as suggested in FIG. 15. First return spring 48 is configured to provide means for yieldably urging movable headrest-retainer rod 24 into a rod-receiving notch 50 upon arrival of movable headrest-retainer rod 24 in a position confronting the rod-receiving notch 50 once a caregiver 28 lets go of first release lever 31 so as to retain headrest 16 in a selected one of the fixed positions on backrest 18.

Headrest 16 includes a head cradle 40 arranged to lie in confronting relation to forward-facing surface 181 of backrest 18. Head cradle 40 is formed to include a head-receiving space 164 located above seat bottom 13 and sized to receive a head of a juvenile seated on seat bottom 13.

Headrest 16 further includes an anchor housing 42 coupled to head cradle 40 to move therewith upwardly and downwardly as a unit relative to backrest 18 as suggested diagrammatically in FIG. 4 and illustratively in FIGS. 11-14. Anchor housing 42 is configured to extend through an opening formed in backrest 18 as suggested in FIGS. 15 and 16 and mate with movable headrest-retainer rod 24 to support movable headrest-retainer rod 24 in spaced-apart relation to head cradle 40 to locate backrest 18 in a position between head cradle 40 and movable headrest-retainer rod 24. The opposite end 482 of first return spring 48 is coupled to anchor housing 42 as suggested in FIG. 15.

Headrest anchor 44 includes a movable headrest-retainer rod 24 arranged to lie in spaced-apart relation to headrest 16 to locate backrest 18 therebetween as suggested in FIG. 11. Anchor receiver 46 comprises first and second plates 51, 52 coupled to backrest 18 and arranged to lie in spaced-apart relation to one another as suggested in FIGS. 5, 6, 8, 15, and 16. Each of first and second plates 51, 52 is formed to include rod-receiving notches 50 sized to receive movable headrest-retainer rod 24 therein to establish the elevation of headrest 16 on backrest 18 and above seat bottom 13 as suggested in FIGS. 11-14. Each rod-receiving notch 50 formed in first plate 51 is associated with a companion rod-receiving notch 50 formed in second plate 52 to establish one of anchor holders 101-106 as suggested in FIGS. 5 and 6. First release lever 31 extends through a lever-receiving slot 401 formed in backrest 18 and located between first and second plates 51, 52 as suggested in FIGS. 15 and 16.

First return spring 48 is located in spaced-apart relation to first plate 51 to locate a portion of rod mover 54 of first release lever 31 therebetween as suggested in FIG. 15. That portion of rod mover 54 is formed to include a notch 60 receiving movable headrest-retainer rod 24 therein.

Headrest-lock release 26 further includes a second release lever 32 mounted for pivotable movement on headrest 16 about pivot axis 30 as suggested in FIGS. 1, 5, 15, and 16. Second release lever 32 is configured to cooperate with first release lever 31 to move headrest anchor 44 relative to anchor receiver 46 from the locked position to the unlocked position in response to substantially simultaneous movement of first and second release levers 31, 32 in a counterclockwise direction 33 about pivot axis 30 as suggested in FIGS. 1-3.

Headrest 16 includes a rear wall 160 arranged to lie in confronting relation to forward-facing surface 181 of backrest 18, a first side wing 161 coupled to one edge of rear wall 160 and arranged to extend in a first direction 201 away from forward-facing surface 181 of backrest 18, and a second side wing 162 coupled to another edge of rear wall 160 and arranged to extend in first direction 201 and to lie in spaced-apart relation to first side wing 161 to define a head-receiving space 164 therebetween sized to receive therein a head of a juvenile seated on seat bottom 13 as suggested in FIGS. 1 and 9. Each of first and second release levers 31, 32 includes a handgrip 163 positioned to lie above seat bottom 13. Handgrips 163 of first and second release levers 31, 32 are arranged to lie in spaced-apart relation to one another to locate first and second side wings 161, 162 of headrest 16 therebetween as suggested in FIGS. 1-3, 15, and 16.

The invention claimed is:

1. A child restraint comprising:
a seat shell including a base providing a seat bottom and a backrest extending upwardly from the base;
a headrest mounted for up-and-down movement on the backrest;
a headrest-height controller arranged to adjust the height of the headrest above the seat bottom, the headrest-height controller includes a headrest lock and a headrest-lock release, wherein the headrest lock includes an anchor receiver coupled to the backrest and formed to include a series of anchor holders, each anchor holder being located at a different elevation above the seat bottom, and a headrest anchor arranged to move relative to the anchor receiver between a locked position engaging a selected first of the anchor holders of the anchor receiver to retain the headrest in a selected fixed position on the backrest to establish the elevation of the headrest above the seat bottom and an unlocked position disengaging anchor holders included in the anchor receiver to free the headrest for up-and-down movement relative to the backrest to assume a different selected fixed position on the backrest associated with a selected second of the anchor holders to establish a new elevation of the headrest above the seat bottom, and wherein the headrest-lock release includes a first release lever mounted for pivotable movement on the headrest about a pivot axis to move the headrest anchor relative to the anchor receiver from the locked position to the unlocked position;
wherein the headrest anchor includes a movable headrest-retainer rod, the backrest includes a forward-facing surface arranged to face in a first direction toward a juvenile seated on the seat bottom and a rearward-facing surface arranged to face in an opposite second direction away from a juvenile seated on the seat bottom, the anchor receiver is coupled to the rearward-facing surface of the backrest and formed to include a series of rod-receiving notches providing the anchor holders and sized to receive the movable headrest-retainer rod therein to establish the elevation of the headrest on the backrest relative to the seat bottom, and the first release lever includes a handgrip positioned to lie in spaced-apart relation to the forward-facing surface of the backrest to locate the backrest between the handgrip and the movable headrest-retainer rod and configured to be gripped by a user pivoting the first release lever about the pivot axis;
wherein the first release lever includes a pivot mount intersecting the pivot axis, a rod mover extending downwardly from the pivot mount in a direction toward the seat base to engage the movable headrest-retainer rod, and a mover actuator extending upwardly from the pivot mount in a direction away from the seat base and including the handgrip; and
wherein the backrest is formed to include a mover-receiving slot having openings in the forward-facing and rearward-facing surfaces of the backrest, and the rod mover of the first release lever extends through the mover-receiving slot to engage the movable headrest-retainer rod and lies in the mover-receiving slot during up-and-down movement of the headrest relative to the backrest.

2. The child restraint of claim 1, wherein the rod mover of the first release lever includes, in series, a downwardly extending leg coupled to the pivot mount, a laterally extending leg arranged to lie in spaced-apart relation to the forward-facing surface of the backrest, and a rearwardly extending leg arranged to extend through the mover-receiving slot formed in the backrest and formed to include a notch receiving the movable headrest-retainer rod therein.

3. The child restraint of claim 1, wherein the headrest includes a rear wall arranged to lie in confronting relation to the forward-facing surface of the backrest, a first side wing coupled to one edge of the rear wall and arranged to extend in the first direction away from the backrest, and a second side wing coupled to another edge of the rear wall and arranged to extend in the first direction and to lie in spaced-apart relation to the first side wing to define a head-receiving space therebetween, and the mover actuator of the first release lever is arranged to lie in spaced-apart relation to the second side wing to locate the first side wing therebetween.

4. The child restraint of claim 1, wherein the headrest lock further includes a return spring coupled at one end to the movable headrest-retainer rod and coupled at an opposite end to the headrest for up-and-down movement therewith relative to the backrest and the return spring is configured normally to urge the movable headrest-retainer rod into one of the rod-receiving notches upon arrival of the headrest at a predetermined elevation above the seat bottom to block further up-and-down movement of the headrest relative to the backrest.

5. The child restraint of claim 1, wherein the headrest anchor includes a movable headrest-retainer rod arranged to lie in spaced-apart relation to the headrest to locate the backrest therebetween, the anchor receiver comprises first and second plates coupled to the backrest and arranged to lie in spaced-apart relation to one another, each of the first and second plates is formed to include rod-receiving notches sized to receive the movable headrest-retainer rod therein to establish the elevation of the headrest on the backrest and above the seat bottom, each rod-receiving notch formed in the first plate is associated with a companion rod-receiving notch formed in the second plate to establish one of the anchor holders, and the first release lever extends through a lever-receiving slot formed in the backrest and located between the first and second plates.

6. The child restraint of claim 5, wherein the headrest lock further includes a return spring coupled at one end to the movable headrest-retainer rod and coupled at an opposite end to the headrest for up-and-down movement therewith relative to the backrest, the return spring is configured normally to urge the movable headrest-retainer rod into one of the rod-receiving notches upon arrival of the headrest at a predetermined elevation above the seat bottom to block further up-and-down movement of the headrest relative to the backrest, the return spring is located in spaced-apart relation to the first plate to locate a rod mover portion of the first release lever therebetween, and the rod mover portion is formed to include a notch receiving the movable headrest-retainer rod therein.

7. The child restraint of claim 1, wherein the headrest-lock release further includes a second release lever mounted for pivotable movement on the headrest about the pivot axis and configured to cooperate with the first release lever to move the headrest anchor relative to the anchor receiver from the locked position to the unlocked position in response to simultaneous movement of the first and second release levers in a counterclockwise direction about the pivot axis.

8. A child restraint comprising:
a seat shell including a base providing a seat bottom and a backrest extending upwardly from the base;
a headrest mounted for up-and-down movement on the backrest;

a headrest-height controller arranged to adjust the height of the headrest above the seat bottom, the headrest-height controller includes a headrest lock and a headrest-lock release, wherein the headrest lock includes an anchor receiver coupled to the backrest and formed to include a series of anchor holders, each anchor holder being located at a different elevation above the seat bottom, and a headrest anchor arranged to move relative to the anchor receiver between a locked position engaging a selected first of the anchor holders of the anchor receiver to retain the headrest in a selected fixed position on the backrest to establish the elevation of the headrest above the seat bottom and an unlocked position disengaging anchor holders included in the anchor receiver to free the headrest for up-and-down movement relative to the backrest to assume a different selected fixed position on the backrest associated with a selected second of the anchor holders to establish a new elevation of the headrest above the seat bottom, and wherein the headrest-lock release includes a first release lever mounted for pivotable movement on the headrest about a pivot axis to move the headrest anchor relative to the anchor receiver from the locked position to the unlocked position;

wherein the headrest anchor includes a movable headrest-retainer rod, the backrest includes a forward-facing surface arranged to face in a first direction toward a juvenile seated on the seat bottom and a rearward-facing surface arranged to face in an opposite second direction away from a juvenile seated on the seat bottom, the anchor receiver is coupled to the rearward-facing surface of the backrest and formed to include a series of rod-receiving notches providing the anchor holders and sized to receive the movable headrest-retainer rod therein to establish the elevation of the headrest on the backrest relative to the seat bottom, and the first release lever includes a handgrip positioned to lie in spaced-apart relation to the forward-facing surface of the backrest to locate the backrest between the handgrip and the movable headrest-retainer rod and configured to be gripped by a user pivoting the first release lever about the pivot axis;

wherein the first release lever includes a pivot mount intersecting the pivot axis, a rod mover extending downwardly from the pivot mount in a direction toward the seat base to engage the movable headrest-retainer rod, and a mover actuator extending upwardly from the pivot mount in a direction away from the seat base and including the handgrip;

wherein the headrest includes a rear wall arranged to lie in confronting relation to the forward-facing surface of the backrest, a first side wing coupled to one edge of the rear wall and arranged to extend in the first direction away from the backrest, and a second side wing coupled to another edge of the rear wall and arranged to extend in the first direction and to lie in spaced-apart relation to the first side wing to define a head-receiving space therebetween, and the mover actuator of the first release lever is arranged to lie in spaced-apart relation to the second side wing to locate the first side wing therebetween; and wherein the mover actuator of the first release lever includes, in series, an upwardly extending leg coupled to the pivot mount and arranged to lie a first distance away from the forward-facing surface of the backrest when the headrest anchor is located in the locked position, a forwardly extending leg arranged to extend in the first direction away from the backrest, and an upwardly extending portion arranged to lie at a greater second distance away from the forward-facing surface of the backrest when the headrest is located in the locked position, and the upwardly extending portion is configured to define the handgrip.

9. The child restraint seat of claim 8, wherein the first release lever is oriented on the pivot axis to cause a portion of the rod mover engaging the movable headrest-retainer rod to move in the second direction away from the rearward-facing surface of the backrest in response to movement of the handgrip included in the mover actuator, under the control of a caregiver pivoting the first release lever, in the first direction away from the forward-facing surface of the backrest to facilitate operation of the first release lever by a caregiver situated in front of the seat shell to face toward the forward-facing surface of the backrest.

10. The child restraint of claim 9, wherein the headrest anchor further includes a return spring coupled at one end to the movable headrest-retainer rod and coupled at an opposite end to the headrest for up-and-down movement therewith relative to the backrest and the return spring is configured to provide means for yieldably urging the movable headrest-retainer rod into a rod-receiving notch upon arrival of the movable headrest-retainer rod in a position confronting the rod-receiving notch once a caregiver lets go of the first release lever so as to retain the headrest in a selected one of the fixed positions on the backrest.

11. The child restraint of claim 10, wherein the headrest includes a head cradle arranged to lie in confronting relation to the forward-facing surface of the backrest and formed to include a head-receiving space located above the seat bottom and sized to receive a head of a juvenile seated on the seat bottom and an anchor housing coupled to the head cradle to move therewith upwardly and downwardly as a unit relative to the backrest and configured to extend through an opening formed in the backrest and mate with the movable headrest-retainer rod to support the movable headrest-retainer rod in spaced-apart relation to the head cradle to locate the backrest in a position between the head cradle and the movable headrest-retainer rod and wherein the opposite end of the return spring is coupled to the anchor housing.

12. A child restraint comprising:
a seat shell including a base providing a seat bottom and a backrest extending upwardly from the base;
a headrest mounted for up-and-down movement on the backrest;
a headrest-height controller arranged to adjust the height of the headrest above the seat bottom, the headrest-height controller includes a headrest lock and a headrest-lock release, wherein the headrest lock includes an anchor receiver coupled to the backrest and formed to include a series of anchor holders, each anchor holder being located at a different elevation above the seat bottom, and a headrest anchor arranged to move relative to the anchor receiver between a locked position engaging a selected first of the anchor holders of the anchor receiver to retain the headrest in a selected fixed position on the backrest to establish the elevation of the headrest above the seat bottom and an unlocked position disengaging anchor holders included in the anchor receiver to free the headrest for up-and-down movement relative to the backrest to assume a different selected fixed position on the backrest associated with a selected second of the anchor holders to establish a new elevation of the headrest above the seat bottom, and wherein the headrest-lock release includes a first release lever mounted for pivotable movement on the headrest about a pivot axis to move the headrest anchor relative to the anchor receiver from the locked position to the unlocked position;

wherein the headrest-lock release further includes a second release lever mounted for pivotable movement on the headrest about the pivot axis and configured to cooperate with the first release lever to move the headrest anchor relative to the anchor receiver from the locked position to the unlocked position in response to simultaneous movement of the first and second release levers in a counterclockwise direction about the pivot axis; and wherein the headrest includes a rear wall arranged to lie in confronting relation to a forward-facing surface of the backrest, a first side wing coupled to one edge of the rear wall and arranged to extend in a first direction away from the forward-facing surface of the backrest, and a second side wing coupled to another edge of the rear wall and arranged to extend in the first direction and to lie in spaced-apart relation to the first side wing to define a head-receiving space therebetween sized to receive therein a head of a juvenile seated on the seat bottom, each of the first and second release levers includes a handgrip positioned to lie above the seat bottom, and the handgrips of the first and second release levers are arranged to lie in spaced-apart relation to one another to locate the first and second side wings of the headrest therebetween.

* * * * *